Aug. 29, 1933.   A. I. MARCUM   1,924,646
VEHICLE DRIVING MECHANISM
Original Filed June 7, 1926
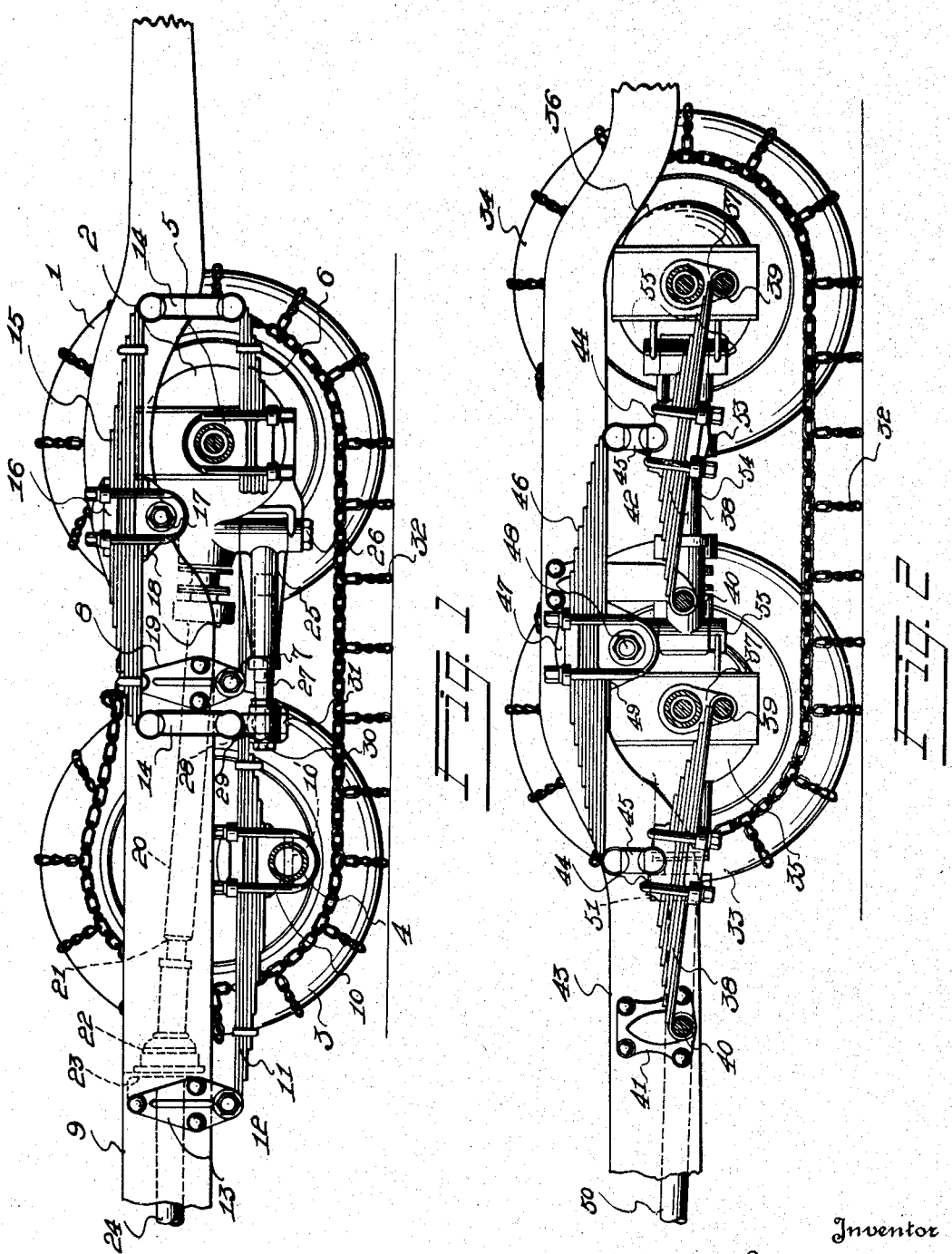

Patented Aug. 29, 1933

1,924,646

UNITED STATES PATENT OFFICE 1,924,646

VEHICLE DRIVING MECHANISM

Arthur I. Marcum, Oakland, Calif., assignor, by mesne assignments, to Automotive Engineering Corporation, a corporation of Delaware Application June 7, 1926, Serial No. 114,250
Renewed January 23, 1933

2 Claims. (Cl. 180—22)

The present invention relates to improved vehicle driving arrangements.

More particularly the invention relates to improvements in vehicle driving arrangements, especially adapted for use in road vehicles provided with tandem axles arranged in pairs. In the most practical arrangements of tandem drive axles heretofore proposed for multi-wheel road vehicles, differentially driven axles interconnected by springs and torque resisting member have been utilized in which the driving torque reactions of the rear driving axle tends to lift the intermediate axle, reducing the load and tractive effort, and increasing the slipping tendency of the intermediate driving wheels. This results in a loss of driving power under conditions when the torque demands are greatest, and when the greatest tractive effort is desired. In certain types of tandem axle drives it is the practice to interpose a compensating differential mechanism between the driving differential mechanisms for the forward and rear driving axle shafts. In arrangements of this type, slipping of any one of the driving wheels results in a complete loss of driving power. Due to the effect of the torquing interconnections between the drive axles in vehicles of this character, the use of the ordinary type of anti-skid chains individual to each wheel to increase the tractive effort under slippery road conditions, does not materially aid the driving effect.

The primary object of the present invention is to provide driving arrangements especially adapted for road vehicles utilizing interconnected tandem axles in which loss of driving effect under slippery road conditions and heavy torque demands is materially reduced.

A further object of the invention is to provide improved chain driving arrangements for road vehicles with tandem differentially driven axles.

Still further objects of the invention will appear in the following detailed description, and are such as may be attained by a utilization of the various combinations, sub-combinations, and principles hereinafter more fully set forth and as defined by the terms of the appended claims.

Referring to the drawing,

Figure 1 is a side elevation illustrating one form of my invention.

Figure 2 is a side elevation illustrating a modified form of my invention.

As shown in Figure 1, a pair of rear wheels 1 support and are driven by a differential drive axle 2 which may be of any well known form, and a pair of intermediate wheels 3 support a dead axle 4. Journaled on and depending from the drive axle 2 are the spring supporting saddles 5 from which a pair of leaf springs 6 are supported intermediate their ends. Springs 6 are disposed adjacent opposite sides of the vehicle frame and are secured by means of pins 7 which are in axial alignment to the brackets 8 secured to and supporting the vehicle frame 9. A kick up is preferably provided in the frame 9 over the rear drive axle 2 in order to provide for a low vehicle body support. Dead axle 4 is preferably offset and has mounted thereon the spring supporting saddles 10 in which the springs 11 are secured intermediate their ends. One of the saddles 10 is preferably journaled on the axle 4, while the other of the saddles 10 is provided with a torque resisting pin 10', or is secured to axle 4 in any other suitable manner for resisting the tendency of the axle to rotate about the axes of wheels 3. Springs 11 are secured at their forward ends by means of axially aligned pins 12 to the brackets 13 which in turn are secured to and support the frame 9 as shown. Springs 6 and 11 are pivotally connected at their rear ends by means of links 14 to the ends of equalizing springs 15. Secured to and supported from the mid portion of each spring 15 is a trunnion member 16 in which the trunnion pins 17 are rotatably supported. Trunnion pins 17 are secured rigidly to and support the frame supporting brackets 18 which are secured to opposite sides of and support frame 9.

Differential drive axle 2 is driven through a flexible or universal connection 19 by means of a propeller shaft section 20 provided with a telescoping or splined joint 21. At its forward end shaft 20 is driven through a universal drive joint or connection 22 which is supported from frame 9 by means of a suitable cross member 23. Universal joint 22 is driven by the propeller shaft section 24 supported in the frame. To resist the tendency of the axle housing 2 to rotate about the axis of the wheels 1 due to the driving force, a torquing socket member 25 is connected to the housing of the axle 2 substantially in the plane of the central longitudinal axis of the vehicle by means of the vertical pivot pin 26. A torque rod 27 fits slidably and rotatably into the socket member 25 and is secured at its forward end by means of a ball and socket connection 28 to cross member 29. Cross member 29 is pivotally connected at its ends by means of the pins 30 to the lower ends of connecting links 31 which at their upper ends are pivotally connected to the rear ends of springs 11. The mechanism so far described is the same as that disclosed in Figures 1 and 2 of my copending application S. N. 71,644. Chains 32 which may be of any well known anti-skid type are passed over the wheels 1 and 3 at each side of the vehicle in the form of interconnecting belts, as shown.

It will be noted that while the vehicle is at rest the frame load is divided equally between the axles 2 and 4. As is well known, the maximum driving force and tractive effort is ordinarily required to accelerate a vehicle from a condition of rest or while moving. When the vehicle is moving at a uniform rate the demand for driving effort or force on the driving axle 2 is ordinarily substantially reduced. In the present invention the torque reactions are transmitted through the telescopic torque resisting connection from the housing of axle 2 to cross member 29 and the rear ends of springs 11. This tends to raise springs 11 and axle 4 and to shift the load through the equalizing springs 15 to the rear axle 2. As a result the frame load on the driving wheels is increased as the torque is increased causing the tractive effort to vary with the demand for the driving force. The belt chain 32 will be held in contact with the ground on its lower side and the differentially driven wheels 1 will grip the chains, drawing the lower legs thereof tight and securing a driving effect not attained by the use of independent chains, thus preventing slippage of the driving wheels and loss of power under very slippery road conditions. It will be observed further that when the wheels are in soft soil, the driven wheels 1 tend to dig into the soil, while wheels 3 do not exhibit this tendency. In the arrangement just described the interconnecting chains 32 cause the traction possibilities of the non-driven wheels to be employed. With the arrangement disclosed it will be noted that as the vehicle passes over road irregularities the axles 2 and 4 are permitted to oscillate about the axes of pins 7 and 12 respectively and to rotate transversely with relation to the frame, and are permitted to move bodily in such manner that the flexibility of the springs is substantially unrestricted due to torque resisting and driving connections. Tires of different load carrying capacity may be provided on the different wheels in accordance with the load carried thereby, and at the same time the advantages of low pressure pneumatic tires and of the interchangeability of the tires may be retained.

In the form of invention shown in Figure 2, the belt chain passes over pairs of ground engaging wheels 33 and 34 which support and are differentially driven by the axles 35 and 36. It will be noted that the chain is loose so that ordinary differential movement of the wheels is not prevented. Formed on the axle housings and disposed outside the vehicle frame side members are the depending spring supporting lugs or extensions 37 to which the rear ends of the pairs of leaf springs 38 are secured by means of the pins 39. The forward ends of the springs 38 are pivotally secured at opposite sides of the vehicle frame by means of the pins 40 to the brackets 41 and 42 which in turn are rigidly secured to and support the vehicle frame side members 43. Supported on and secured to the mid portions of the springs 38 are the saddles 44. Saddles 44 are connected by means of the pivotally secured links 45 to the ends of the equalizing springs 46. Secured to and supported on the mid portions of the equalizing springs 46 are the frame supporting saddles 47. Pivotally supported in the saddles 47 are the trunnion pins or members 48 which in turn are rigidly secured to the brackets 49, in turn secured to and support frame side members 43.

The axle 35 as shown is preferably of the through drive type disclosed in copending application S. N. 705,482, filed April 10, 1924, now Patent No. 1,670,119, dated May 15, 1928, provided with a compensating differential drive mechanism between the axle shafts differential driving mechanism and the through drive shaft. Axle 35 is driven by means of a propeller shaft 50 through a flexible or universal driving connection 51. The forward end of the shaft 50 is driven from a transmission of any well known type, not shown, through a flexible joint or connection. The rear drive axle 36 may be of any usual differential drive type and is driven by means of a telescopic intermediate shaft provided with the flexible or universal drive connections 53 which in turn are driven from the through drive connection of the axle 35 as disclosed in the copending application. A suitable telescoping torquing connection 54 is provided and is connected to the axles 35 and 36 by means of the vertical pivot pins 55. This mechanism is the same as that shown in copending application S. N. 68,298 filed November 11, 1925.

It will be noted that the springs 38 are inclined downward from the front of the vehicle to the rear. While this inclination is not essential it is desirable and improves the operation of the spring suspension due to the fact that shocks from road impacts are transmitted through the axles substantially at a greater angle to the spring leaves than if the springs are not inclined. Due to the connection between the mid portions of the springs 38 through the equalizing spring 46 as shown road shocks are transmitted through the entire spring suspension before being transmitted to the frame, and the deflections of the springs 38 are equalized so that no change in the distance between the axles occurs due to the spring deflections. In this way the stress and shock due to the passage of the vehicle over road irregularities on the intermediate drive and on the torquing interconnections between the two axles is minimized. The driving torque reactions of the rear axle tend to raise the forward axle. Due to the use of the compensating differential, loss of traction at one wheel will result in a complete loss of driving force. The chains 32, however, will prevent the slipping of the forward driving wheels under the heaviest torque demands when the lifting tendency on the forward axle is greatest and an effective drive under all conditions is provided.

Having described preferred embodiments only of my invention, what is desired to be secured by Letters Patent and is claimed as new is:

1. In a road vehicle, a frame, a pair of axles, at least one of which is driven, arranged relatively close together adjacent one end of said frame, a pair of wheels on each of said axles, a pair of springs on either side of the frame, each of which is pivoted to the frame at one end and connected to its corresponding axle at a point spaced from said one end, means interconnecting the individual springs of each pair to permit a relatively large vertical oscillation of one axle with respect to the other and endless traction members surrounding the adjacent wheels on the same side of the vehicle, said traction members being provided with a slight amount of slack to permit said vertical oscillation of one axle with respect to the other and to transmit a part of the driving force of one wheel to the other when substantial slipping of a driven wheel occurs.

2. In a road vehicle, a frame; a pair of axles arranged in tandem adjacent one end of the frame; a set of driven wheels on each of said axles; a spring construction connecting said axles and frame together, said construction comprising an individual spring connecting each axle with the frame and an equalizing member interconnecting said individual springs with the frame, and thereby permitting substantially great relative movement between said axles and hence between said wheels; a torque member extensibly secured between said axles in substantially the same horizontal plane of the axles; and an endless traction means at each side of the vehicle interconnecting one of the wheels of one set and one of the wheels of the other set to transmit a part of the driving force of one wheel to the other when slipping of said one wheel occurs, said traction means being sufficiently elongated to permit the aforesaid relative wheel movement.

ARTHUR I. MARCUM.